(12) United States Patent
Kirihata

(10) Patent No.: US 8,316,199 B2
(45) Date of Patent: Nov. 20, 2012

(54) DATA PROCESSING CONTROL METHOD, INFORMATION PROCESSING APPARATUS, AND DATA PROCESSING CONTROL SYSTEM

(75) Inventor: Yasuhiro Kirihata, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 1107 days.

(21) Appl. No.: 11/813,184

(22) PCT Filed: Nov. 7, 2006

(86) PCT No.: PCT/JP2006/022186
§ 371 (c)(1),
(2), (4) Date: Jun. 29, 2007

(87) PCT Pub. No.: WO2008/056410
PCT Pub. Date: May 15, 2008

(65) Prior Publication Data
US 2009/0319731 A1   Dec. 24, 2009

(51) Int. Cl.
*G06F 00/12* (2006.01)
(52) U.S. Cl. ........................................................ 711/163
(58) Field of Classification Search .................... 711/163
See application file for complete search history.

(56) References Cited

U.S. PATENT DOCUMENTS

| | | | |
|---|---|---|---|
| 5,813,017 A | 9/1998 | Morris | |
| 6,374,268 B1 | 4/2002 | Testardi | |
| 6,378,071 B1 | 4/2002 | Sasaki et al. | |
| 7,155,572 B2 | 12/2006 | Hughes et al. | |
| 7,193,923 B2 * | 3/2007 | Nishihara et al. | 365/230.03 |
| 2006/0098818 A1 * | 5/2006 | Fifer et al. | 380/37 |

FOREIGN PATENT DOCUMENTS

| | | |
|---|---|---|
| CN | 1754158 A | 3/2006 |
| JP | 63-293637 | 11/1988 |
| JP | 4-359283 | 12/1992 |
| JP | 5-233460 | 9/1993 |
| JP | 06-187143 | 7/1994 |
| JP | 10-301856 | 2/1998 |
| JP | 2000-76152 | 3/2000 |

(Continued)

OTHER PUBLICATIONS

How computers work. see the attachment.*

(Continued)

*Primary Examiner* — Yaima Campos
*Assistant Examiner* — Hamdy S Ahmed
(74) *Attorney, Agent, or Firm* — Mattingly & Malur, PC

(57) ABSTRACT

In a system which realizes to prevent leakage/loss of secret information by prohibiting a write operation to a secondary storage apparatus and a write operation to an external medium, an automatic collection of secret data to a server is executed, an existing application mode of PC is not damaged, and then an update of OS and an application is executed. The present invention places a secondary storage apparatus write control driver on the lower level than a file system, and redirects a write operation to the secondary storage apparatus, setting up a memory to be a primary cache, and cache data file on a cache server of a network destination to be a secondary cache. Thereby, the write operation to the secondary storage apparatus is not executed, and difference data is stored on the cache server, so that the automatic collection of secret data to the server can be realized.

11 Claims, 11 Drawing Sheets

FOREIGN PATENT DOCUMENTS

| | | |
|---|---|---|
| JP | 2000-148480 | 5/2000 |
| JP | 2003-076610 | 3/2003 |
| JP | 7-182221 | 7/2005 |
| JP | 2005-258926 | 9/2005 |
| JP | 2005-352535 A | 12/2005 |
| JP | 2006-503369 | 1/2006 |
| JP | 2006-172449 | 6/2006 |
| JP | 2006-185209 | 7/2006 |
| WO | 01/98951 A1 | 12/2001 |
| WO | 03/012578 A2 | 2/2003 |
| WO | 2004/070519 A2 | 8/2004 |

OTHER PUBLICATIONS

How Computers Work by Ron White (pp. 58-61) Copyright 1994 by Ziff-Davis Press.*

* cited by examiner

DATA PROCESSING CONTROL METHOD, INFORMATION PROCESSING APPARATUS, AND DATA PROCESSING CONTROL SYSTEM

TECHNICAL FIELD

The present invention relates to a data processing control method, an information processing apparatus, and a data processing control system which provide a write protect for a secondary storage apparatus of a user terminal and prohibit a write to an external medium.

BACKGROUND ART

Conventionally, there has been a method for controlling removal of secret data by encrypting and storing a file when a secret file is stored in the secondary storage apparatus of a user terminal. In this method, even if a file is removed, it does not mean that the information itself is removed because the file is encrypted. For example, Patent Document 1 (JP Patent Publication (Kokai) No. 11-149414 A (1999)) discloses an automatic file cryptograph system which interrupts to a file I/O processing of OS to automatically execute processing of encrypting and decrypting, and thereby makes the system convenient for a user.

In addition, there is a method which allows editing of a secret file and prevents information leakage by implementing an access control for, for example, a removable device and a printing device.

However, there is a trend that losing a mobile PC having a secret file of customer information and the like, which has been encrypted and stored in the mobile PC, will not be socially accepted even with the fact that the secret information is not at risk of leakage because it is encrypted. If a company has lost an encrypted file, the company must announce such a fact that the file has been lost, and is criticized seriously and socially. Then it is feared that even a life of the company might be lost. Thus, there is such a great need that secret information may be utilized and viewed, but not stored for a PC which can be lost, such as a mobile PC. However, the automatic file cryptograph system disclosed in the Patent Document 1 can not meet this need.

The present invention has been developed in consideration of such a circumstance, and provides a system which enables a more secure reference to information.

DISCLOSURE OF THE INVENTION

In order to solve the above problem, the present invention provides a mechanism in which OS and an application reside in a user terminal, and in which for a data write operation of the OS and the application, a difference of write data is hooked with a filter driver, or a kernel module of OS, and stored in a server in a network destination. Thereby, while it seems that OS and an application write data in a local disk, the data can be forced to be actually stored in the server in a network destination. By using such a system, secret data can be automatically collected in the server in a usual application mode without manually uploading a file generated locally to the server, as compared with caching of data simply in a memory to prohibit a write to the secondary storage apparatus. In addition, a system update which must normally be stored, such as a setting of an application and a patch of OS, is also stored in the server side, thus, it is not necessary to provide a special update mode.

That is, a data processing control method of the present invention is a method of controlling data processing for the secondary storage apparatus of a information processing apparatus including the secondary storage device, characterized in that a secondary storage apparatus control unit installed in the information processing apparatus obtains a processing request by any application to the secondary storage apparatus, if this processing request is a data write request, prohibits a write to the secondary storage apparatus, and instead, executes a write operation to a volatile memory. In addition, the secondary storage apparatus control unit further stores the data written in the volatile memory to an external storage unit connected to the information processing apparatus.

The secondary storage apparatus control unit writes a difference between data in an initial state of the secondary storage apparatus and modified data obtained by modifying the data in the volatile memory.

Further, if the processing request is a request of a data read, the data to be read is read from the secondary storage apparatus, and the modified data obtained by modifying this data to be read is read from the volatile memory, and the data to be read is overwritten with this modified data and is presented.

Further, when the information processing apparatus is initiated, the secondary storage apparatus control unit controls the apparatus to access an external storage unit connected to the information processing apparatus, obtains attribute information of data stored in the external storage unit, and generates a data list having the attribute information in the volatile memory. The data list includes the attribute information of an address of data in the secondary storage apparatus, a data size, and an address of data in the volatile memory. The data list further includes information indicating whether or not the data itself stored in the external storage unit exists in the volatile memory.

Another data processing control method according to the present invention is a method of controlling data processing for the secondary storage apparatus in the first information processing apparatus including the secondary storage apparatus, characterized in that a file access control unit installed in the first information processing apparatus obtains a processing request by any application to the secondary storage apparatus to determine a content of the request, and if a file or a folder targeted by this processing request should be transferred to the second information processing apparatus in a network destination (e.g., a file server connected through a network), it is transferred to the second information processing apparatus, and if a file or a folder targeted by this processing request should not be transferred to the second information processing apparatus, the secondary storage apparatus control unit installed in the first information processing apparatus obtains the processing request, prohibits a write operation to the secondary storage apparatus, and, instead, executes a write operation to the volatile memory. If the processing request is a data read request, the data to be read is read from the secondary storage apparatus, and the modified data obtained by modifying this data to be read is read from the volatile memory, and the data to be read is overwritten with this modified data and is presented.

An information processing apparatus according to the present invention is an information processing apparatus characterized by including a secondary storage apparatus, a secondary storage apparatus control unit for controlling processing for this secondary storage apparatus, and a volatile memory, wherein the secondary storage apparatus control unit obtains a processing request by any application for the secondary storage apparatus, and if this processing request is a data write request, prohibits the write operation to the secondary storage apparatus, and, instead, executes a write operation to the volatile memory.

Further information processing apparatus according to the present invention is an information processing apparatus characterized by including a secondary storage apparatus, a file access control unit for controlling a file access to the external storage unit connected through a network, a secondary storage apparatus control unit for controlling processing for the secondary storage apparatus, and a volatile memory, wherein the file access control unit obtains a processing request by any application to the secondary storage apparatus to determine a content of the request, and if a file or a folder targeted by this processing request should be transferred to the external storage unit in a network destination, it is transferred to the external storage unit, and if a file or a folder targeted by the processing request should not be transferred to the second information processing apparatus, the secondary storage apparatus control unit obtains the processing request, prohibits a write operation to the secondary storage apparatus, and, instead, executes a write operation to the volatile memory.

The data processing control system according to the present invention is a data processing control system controlling a write to data, characterized by including an information processing apparatus and an external storage unit connected to the information processing apparatus, the information processing apparatus including a secondary storage apparatus, a secondary storage apparatus control unit for controlling processing for this secondary storage apparatus, and a volatile memory, wherein the secondary storage apparatus control unit obtains a processing request by any application to the secondary storage apparatus, and if this processing request is a data write request, prohibits a write operation to the secondary storage apparatus, and, instead, executes a write operation to the volatile memory, and the secondary storage apparatus control unit further stores data written in the volatile memory in the external storage unit.

Further data processing control system according to the present invention is a file processing control system controlling a write to a file, characterized by including an information processing apparatus and an external storage unit connected to the information processing apparatus, the information processing apparatus including a secondary storage apparatus, a file access control unit for controlling a file access to an external storage unit connected through a network, a secondary storage control unit for controlling processing for the secondary storage apparatus, and a volatile memory, wherein the file access control unit obtains a processing request by any application to the secondary storage apparatus to determine a content of the request, and if a file or a folder targeted by this processing request should be transferred to the external storage unit in a network destination, transfers to the external storage unit, and if the file or the folder targeted by the processing request should not be transferred to the second information processing apparatus, the secondary storage apparatus control unit obtains the processing request, prohibits a write operation to the secondary storage apparatus, and, instead, executes the write operation to the volatile memory.

The further characteristics of the present invention will be apparent by the following best mode for carrying out the present invention and the attached drawings.

According to the present invention, it is possible to realize a system which allows reference to and editing of secret information in a more secure manner.

DESCRIPTION OF SYMBOLS

Figure 1:
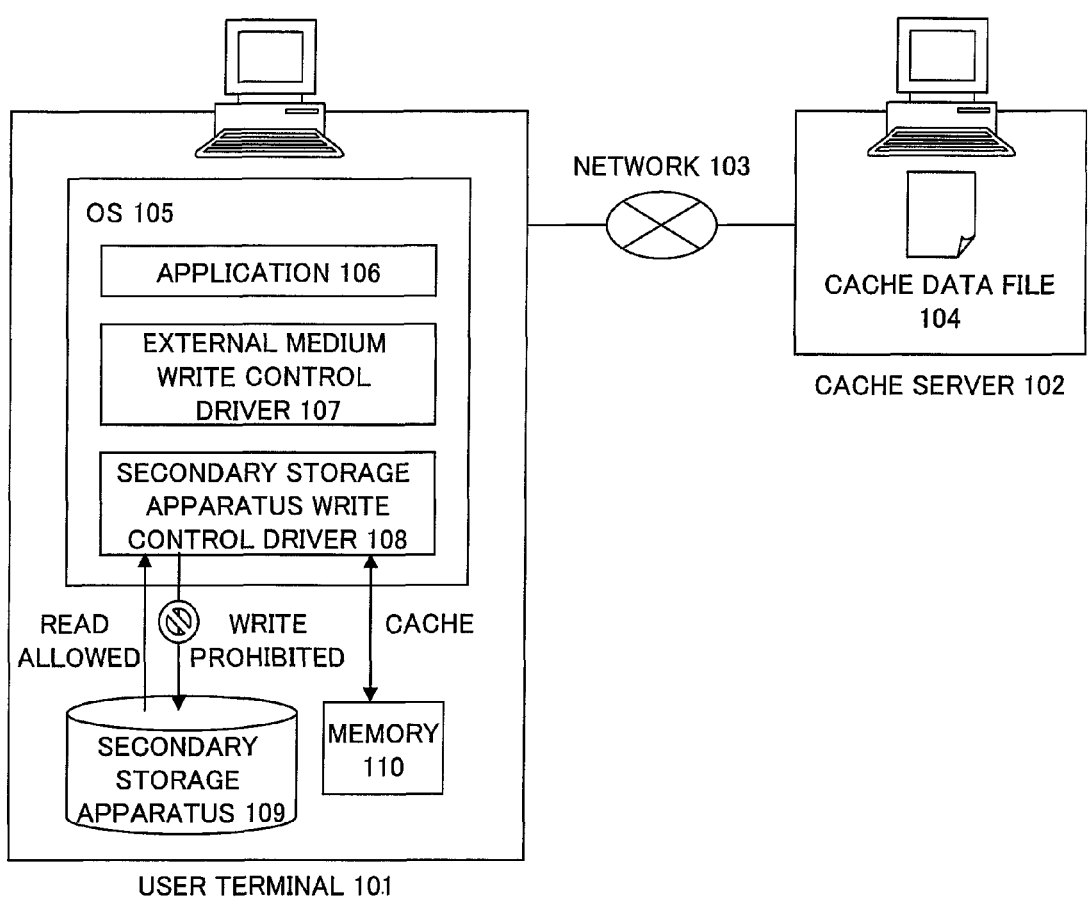
FIG. 1 is a diagram illustrating a configuration of a data processing control system according to the first exemplary embodiment of the present invention.

101 . . . user terminal
102 . . . cache server
103 . . . network
104 . . . cache data file
105 . . . OS
106 . . . application
107 . . . external medium write control driver
108 . . . secondary storage apparatus write control driver
109 . . . secondary storage apparatus
110 . . . memory
202 . . . file system
206 . . . communication driver
207 . . . user mode
208 . . . kernel mode
301 . . . beginning block number
302 . . . size
303 . . . data pointer
304 . . . primary cache flag
403 . . . data offset
902 . . . file server
904 . . . secret data
907 . . . file access control driver

BEST MODE FOR CARRYING OUT THE INVENTION

Exemplary embodiments of the present invention will be described in detail below using the attached drawings. Meanwhile, the exemplary embodiments of the present invention are just examples to realize the present invention, and the present invention is not limited to such examples.

As described above, the present invention provides a system which can refer to and edit secret information more securely. Thus, the exemplary embodiments realizes functions for prevention of losing secret information, automatic collection of secret data to a server, and storing setting and update of an application and OS without changing an application mode.

The First Exemplary Embodiment

FIG. 1 is a system configuration diagram of the first exemplary embodiment of the present invention. The system includes a user terminal 101 and a cache server 102, each of them is connected by a network 103. The user terminal 101 is an existing PC, and includes a memory 110 and a secondary storage apparatus (e.g. a hard disk drive HDD) 109, and OS 105, an application 106, an external medium write control driver 107, and a secondary storage apparatus write control driver 108 are installed. By the way, the application 106 is not specific, and refers to any existing application.

For example, a user initiates OS 105 with the user terminal 101, and edits secret data by using the application 106. If it is stored locally after the editing, the data is cached in the memory 110 (primary cache) by the secondary storage apparatus write control driver 108, is transferred periodically to the cache server 102, and is stored as a cache data file 104. Thus, the data is not stored in the secondary storage apparatus 109, the secret data is collected in the cache server 102. That is, the secondary storage apparatus write control driver 108 allows reading data of the secondary storage apparatus, but prohibits writing data to it. As described in detail below, if a write instruction is executed, difference data is cached in the memory 110 instead of writing data in the secondary storage apparatus 109. The difference data refers to a difference between original data in the secondary storage apparatus 109 and modified data. By this processing, while it seems to a user as if the modified data would have been stored in the secondary storage apparatus (it has been stored virtually in the secondary storage apparatus), it is not stored actually in the secondary storage apparatus 109, and it is stored in the primary cache 110 or the cache server 102.

The external medium write control driver 107 is a module which prohibits writing data to an external medium such as a USB memory and an external hard disk. For example, data is blocked by applying a filter driver on USB with this module, so that it is possible to prevent secret data from leaking from the user terminal to the outside.

The cache data file 104 stored in the cache server 102 is a file which stores difference data between an initial state (e.g. a state in which setting of OS and necessary applications has been terminated) of the secondary storage apparatus of the user terminal and a current file configuration. A copy of the cache stored in the memory is uploaded periodically to the server side, so that the state of the newest file configuration is maintained.

Figure 2:
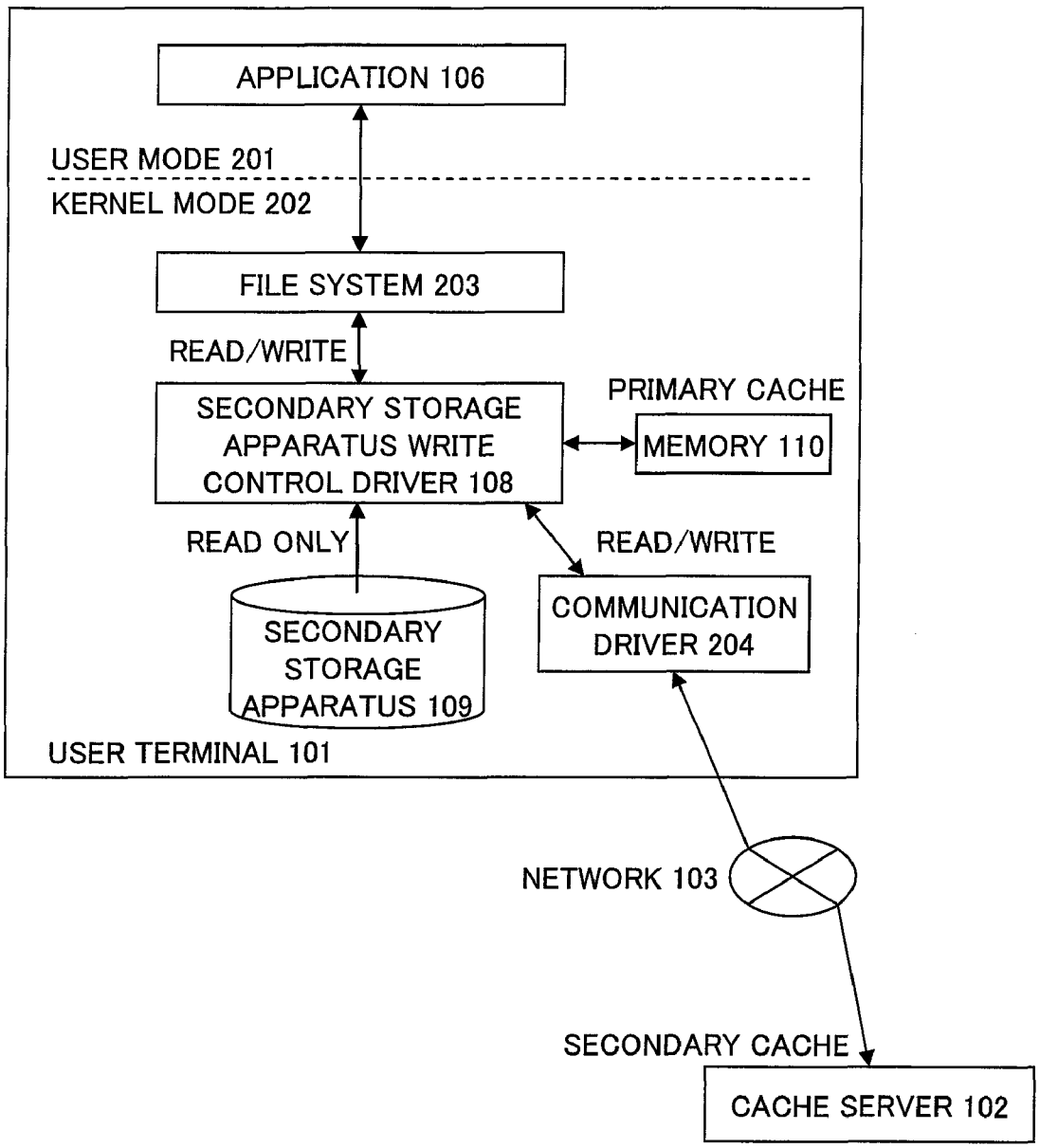
FIG. 2 is a diagram illustrating an internal architecture of a system according to the first exemplary embodiment of the present invention.

FIG. 2 is a diagram illustrating an internal architecture of the first exemplary embodiment of the present invention. While OS is assumed to be Windows (registered trade name), it is possible to realize the same architecture with another OS, it does not limit the present invention. Windows (a registered trade name) has two operation modes of a user mode 201 and a kernel mode 202. Generally, the user mode 201 is a mode in which the application 106 operates, and the kernel mode 202 is a mode in which basic components forming OS such as device drivers operate. While a file system 203 such as NTFS and FAT operates in the kernel mode 202, the secondary storage apparatus write control driver 108 is placed at the lower layer. This secondary storage apparatus write control driver 108 is a driver which prohibits a write operation to the secondary storage apparatus 109, and stores write data in the memory 110 or the cache server 102 in a network 205 destination via a communication driver 204 for a write request transferred from the file system 203 (a request for storing modified data).

A cache in the memory 110 is a primary cache, and a cache on the cache server 102 is utilized as a secondary cache. Basically, every write data is stored in the primary cache, and is also copied periodically to the secondary cache. If the size of the primary cache exceeds a prescribed threshold, the primary cache data whose usage frequency is less among data copied already in the secondary cache is disposed. With such configuration, it is possible to prevent memory overflow due to increase of the primary cache, and allow high speed access to the cache. Meanwhile, when data of the primary cache is copied to the secondary cache, an algorithm for determining a copy block refers to LRU (Least Recently Used), etc., and this algorithm is arbitrary, and does not limit the present invention. Meanwhile, while the cache server 102 is essential when the user terminal 101 is used in a network environment, the primary cache 110 is not necessarily essential. However, if the primary cache 110 is installed, such a technical effect that processing speed is increased is obtained because it is not required to access the cache server 102 every time. When the user terminal 101 is used in such a stand alone environment that it can not be connected to a network, the primary cache 110 is essential.

Figure 3:
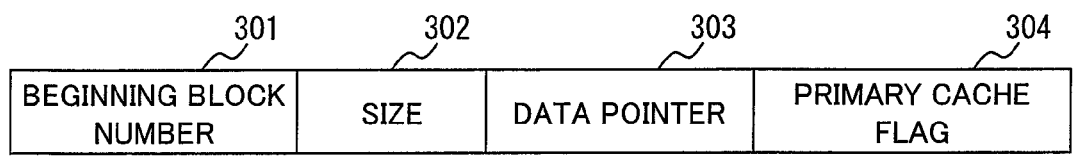
FIG. 3 is a diagram illustrating a schema of a primary cache management table.

FIG. 3 is a diagram illustrating a schema of a primary cache management table. While this table exists in the memory 110, data write to this table is controlled by the secondary storage apparatus write control driver 108. In FIG. 3, the schema includes four attributes of a beginning block number 301, a data size 302, a data pointer 303, and a primary cache flag 304. The beginning block number 301 is a beginning sector address of data on HDD, the data pointer 303 is an address of data in the memory (primary cache) 110, and the primary cache flag 304 is a flag indicating whether or not target data is included in the primary cache. Meanwhile, the reason that the primary cache flag 304 is set up is that it is necessary to quickly identify the existence because data is lost and does not exist when the electric power is turned off, and the target data is in the cache server when a booting operation is executed. With this primary cache flag 304, it is possible to quickly jump to the cache server (secondary cache) 102 when the target data is not in the primary cache 110 and then obtain the data, thus speed up of the processing can be realized.

In a write/read request transferred from the file system to the secondary storage apparatus write control driver, the beginning address and the size information of a block, an access target on the secondary storage apparatus, is designated. If the data write is initiated, the beginning block address and the size information of the write data are obtained from this request, and are registered in the primary cache management table. Then, a physical memory is assigned, the write data is copied, and cache data is configured. A pointer on a physical memory in which the actual cache data is stored is registered in data pointer 303. The primary cache flag 304 is, as described above, a flag indicating whether or not the target cache data is included in the primary cache. While the primary cache management table has an entry regarding every cached data, not every data is stored in the primary cache. If this flag is TRUE, the cache data exists in the memory, so that the data pointer 303 is a pointer to the cache data. If this flag is FALSE, the cache data does not exist in the primary cache, so that it means to exist only in the secondary cache of the cache server, and the data pointer 303 is an invalid value.

Figure 4:
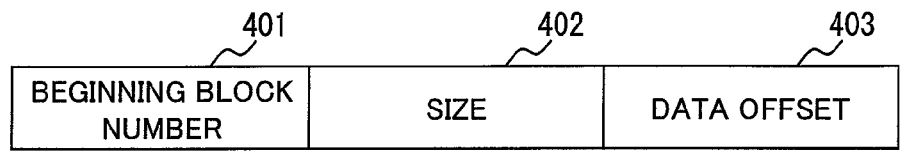
FIG. 4 is a diagram illustrating a schema of a secondary cache management table.

FIG. 4 is a diagram illustrating a schema of a secondary cache management table. This schema includes three attributes of a beginning block number 401, a size 402, and a data offset 403. The beginning block number 401 and the size 402 refers to the beginning block number and the size on the secondary storage apparatus 109 of each cached data, respectively. The data offset 403 refers to a location in which target entry data of the cache data is stored. The secondary cache overwritten with the primary cache refers to the newest cache state, the secondary cache management table does not have an entry of every cache data, and it is not the newest state at real time. However, it is caused to be the newest state when the system is shut down, or the primary cache is copied periodically to the secondary cache.

Figure 5:
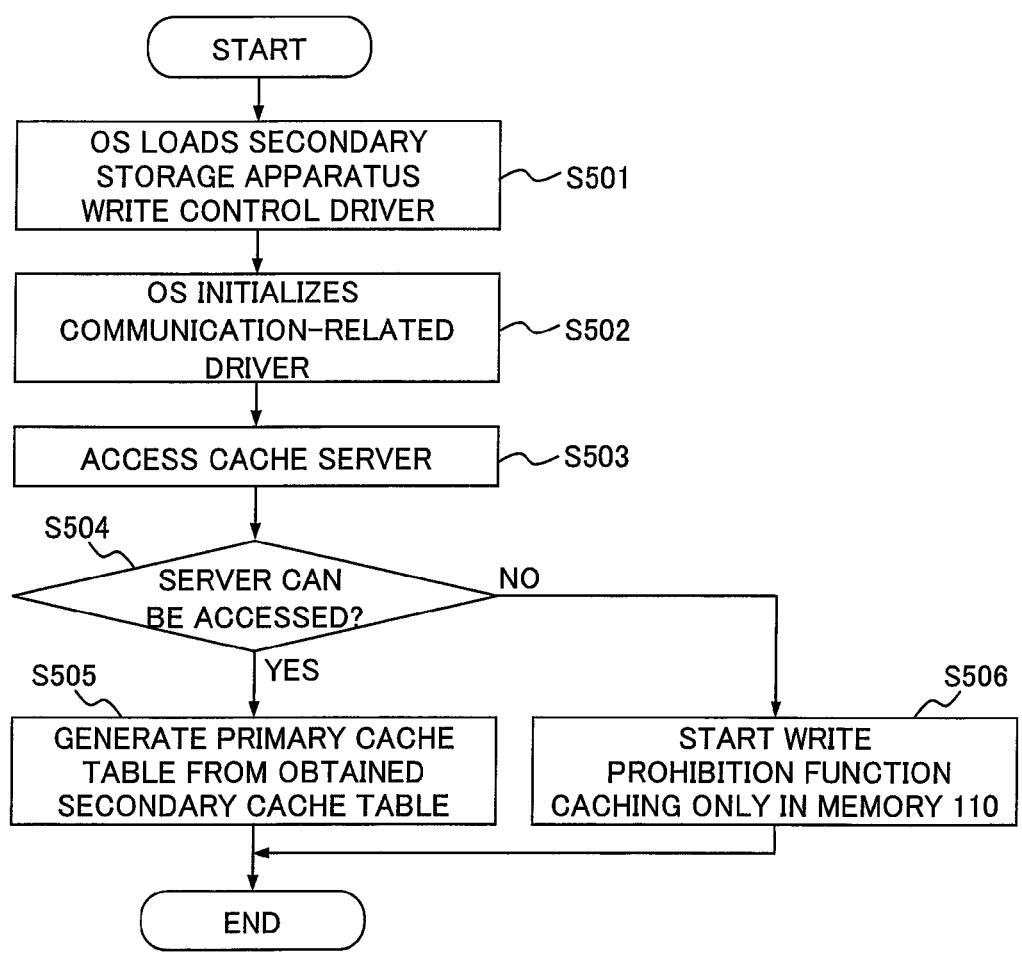
FIG. 5 is a flowchart describing processing of a secondary storage apparatus write control driver when a user terminal is initiated.

FIG. 5 illustrates a flowchart for processing of the secondary storage apparatus write control driver 108 when the user terminal is initiated (the primary cache is empty). When the user terminal is initiated, OS loads the secondary storage apparatus write control driver (step S501). Next, OS initializes the communication-related driver (step S502). In the case of Windows (registered trade name), such a timing that OS loads the driver is determined according to a registered content of the driver. Thus, it is possible to cause the secondary storage apparatus write control driver to be loaded before the communication-related driver is loaded.

Next, the secondary storage apparatus write control driver 108 accesses the cache server by using the initialized communication driver (step S503). At this time, it is decided whether or not the cache server 102 can be accessed (step S504). That is, for example, it is decided whether or not it has been able to be accessed by actually accessing the server (the network can be linked). If the electric power of the cache server 102 is OFF, or if the service itself has an error even if the service is running, it is not accessible.

If it is decided that it is accessible, the secondary storage apparatus write control driver 108 obtains a secondary cache table from the cache server, and generates a primary cache table (step S505). If it is decided that the cache server 102 can not be accessed, the write data is cached only in the memory 110, and the write prohibition function is caused to operate (step S506).

Thus, if it is initiated under such a circumstance that the cache server can be accessed in the network environment, it is initiated in such a mode that the cache is stored in the cache server. However, otherwise, it is cached only in the memory, and it is initiated in such a mode that the write data is not synchronized with the cache server, so that the write data is lost when the electric power is turned off.

Figure 6:
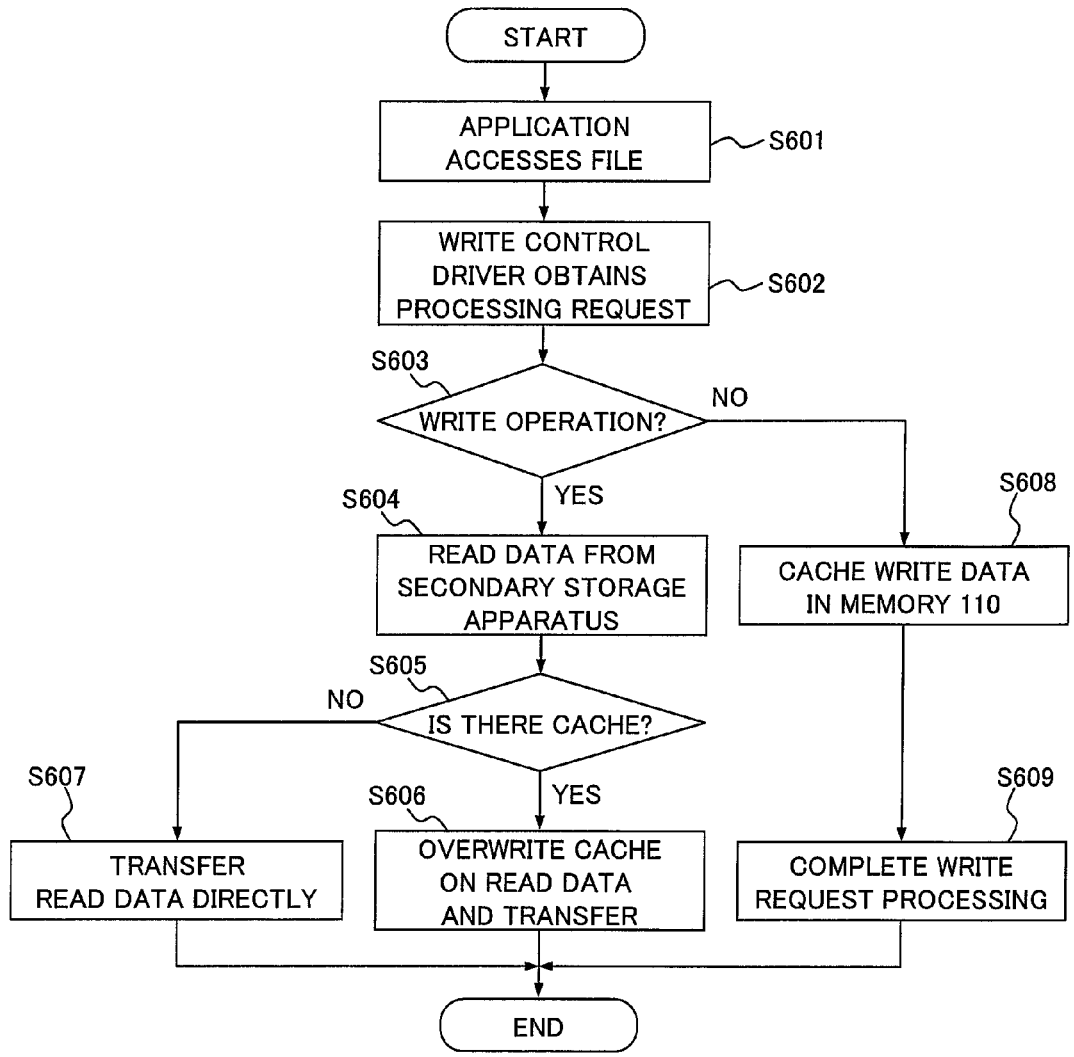
FIG. 6 is a flowchart describing processing of the secondary storage apparatus write control driver when a file is accessed.

FIG. 6 is a diagram illustrating a flowchart of processing of the secondary storage apparatus write control driver 108 as accessing a file existing in the secondary storage apparatus 109. In FIG. 6, if an application accesses a file (step S601), the secondary storage apparatus write control driver 108 obtains a write operation request from the file system (step S602). It is decided whether or not the request is a write operation at the time that the request is obtained (step S603). If it is decided that it is a write operation, write data (as described below, difference data between modified data and data on HDD) is cached in the memory 110 (step S608), and the write operation request is completed (step S609).

On the other hand, if it is decided at step S603 that it is not a write operation, the operation is a read operation, then, first, the target data is read from the secondary storage apparatus (step S604). Next, it is decided whether or not read data has been already in the memory 110 (primary cache) (step S605). If it is not in the primary cache, the read data is transferred directly to the file system (step S607). If it is in the primary cache, the primary cache is overwritten on the read data and is transferred to the file system (step S606). An actual processing content of registering data in the cache, or obtaining data from the cache will be described further by using FIG. 7 and FIG. 8.

Figure 7:
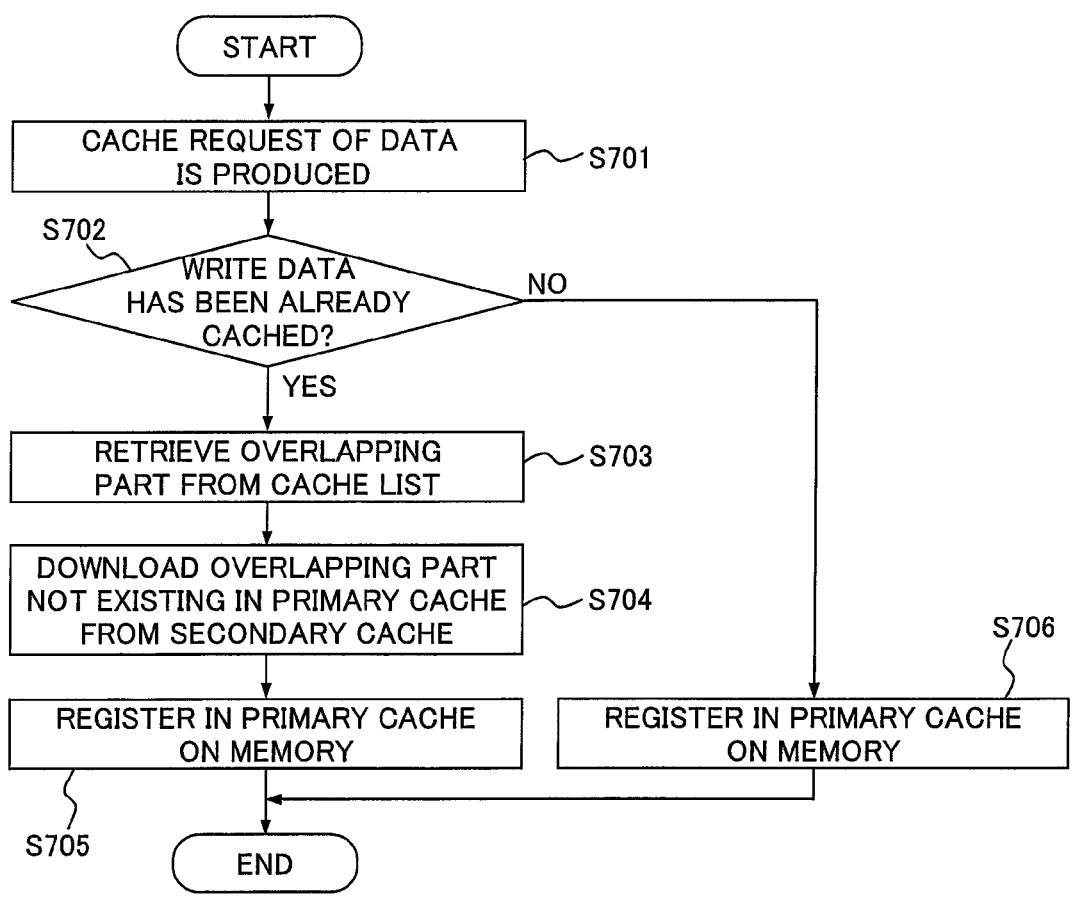
FIG. 7 is a flowchart describing processing of caching data.

FIG. 7 illustrates a flowchart of processing of caching data. A flowchart of FIG. 7 is a flowchart describing the step S608 of FIG. 6 in detail.

In FIG. 7, if a data write is executed, and a data cache request is produced (step S701), it is decided whether or not the write data has been already cached in the memory 110 (step S702). If it is decided that it has not been cached, it is registered on the primary cache of the memory 110 (step S706).

If it is decided that it has been already cached, a part overlapping the write data is retrieved from the cache list (the primary cache management table: refer to FIG. 3) (step S703). If it has been already cached, the overlapping part exists certainly. In this overlapping part, a part which does not exist in the primary cache is checked from the primary cache flag 304 of the primary cache management table to be downloaded from the secondary cache (step S704). Finally, the write data is registered in the primary cache on the memory (step S705). In this registration, such processing is executed that the overlapping part of the write data is overwritten in a cache of the cache list, and other part is newly registered.

Figure 8:
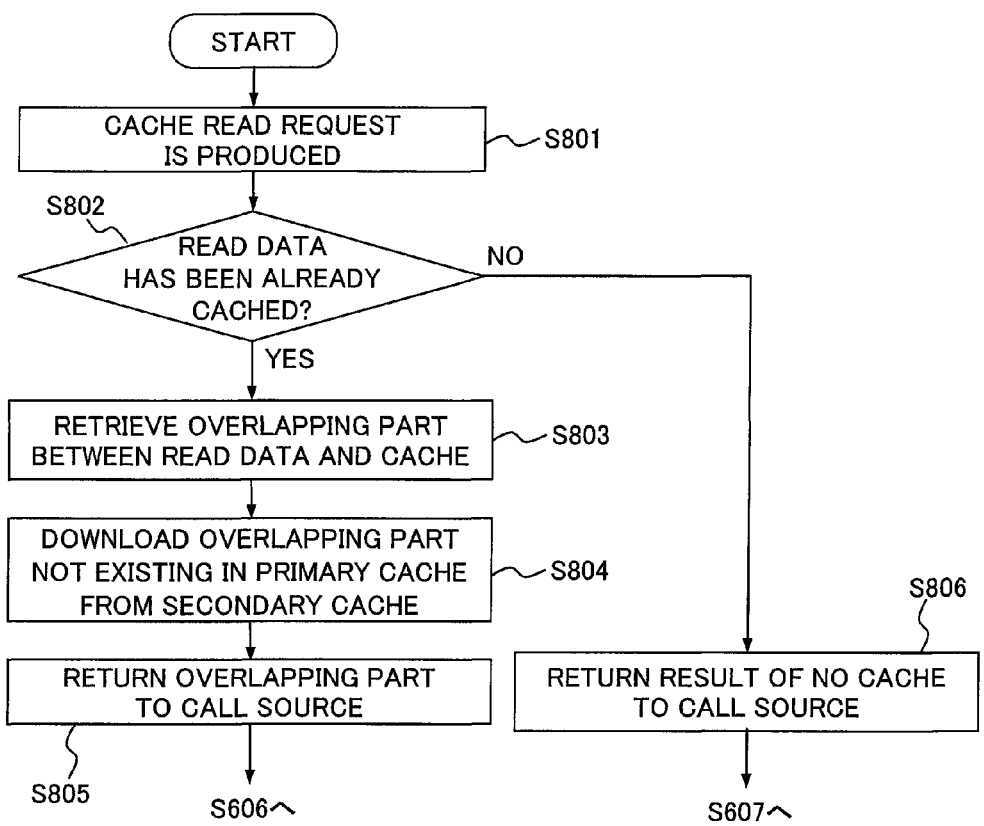
FIG. 8 is a flowchart describing processing of retrieving data from a cache.

FIG. 8 is a flowchart of processing of retrieving data from a cache. A flowchart of FIG. 8 is a flowchart describing the step S605 of FIG. 6 in detail.

In FIG. 8, first, a cache read request is produced (step S801). Next, it is decided whether or not the read data has been already cached in the memory (primary cache) 110 (step S802). If the read data has not been cached, a result that it has not been cached is returned to a call source (a function of the secondary storage apparatus control driver 108) (step S806). If the read data has been already cached, an overlapping part between the read data and the cache exists, so that the overlapping part is retrieved (step S803). Actually, the overlapping part which has been already cached within an area of the read data is retrieved by comparing a beginning block address and size information of the read data, and a beginning block address and size information of each cache. Next, a part which is the overlapping part and is not in the primary cache (memory 110) is downloaded from the secondary cache (cache server 102) (step S804). Finally, this overlapping part is returned to a call source, and the processing is terminated (step S805).

By adopting the above configuration, every write data to the local is stored in the cache server. In this case, every installation and update of an application and a component of OS is stored in the cache server. Thus, modification content is not stored in the local, but in the cache server, so that a usual application mode is not damaged. Further, a specific update mode is not required to update an OS patch and a virus pattern.

The Second Exemplary Embodiment

Subsequently, the second exemplary embodiment according to the present invention will be described. In the first exemplary embodiment, when it is required to be stored as data in the secondary cache, not only data of each user but also system information (e.g. all data of the system itself not depending on a user, such as a change of setting of a network) are all stored, on the other hand, in the second exemplary embodiment, the processing of storing only data of each user in the secondary cache is executed, not storing all including the system information. In the second exemplary embodiment, a cache processing of a file unit is executed, further, because data of each user has a personal strong attribute, it is stored in the secondary cache even while processing.

Figure 9:
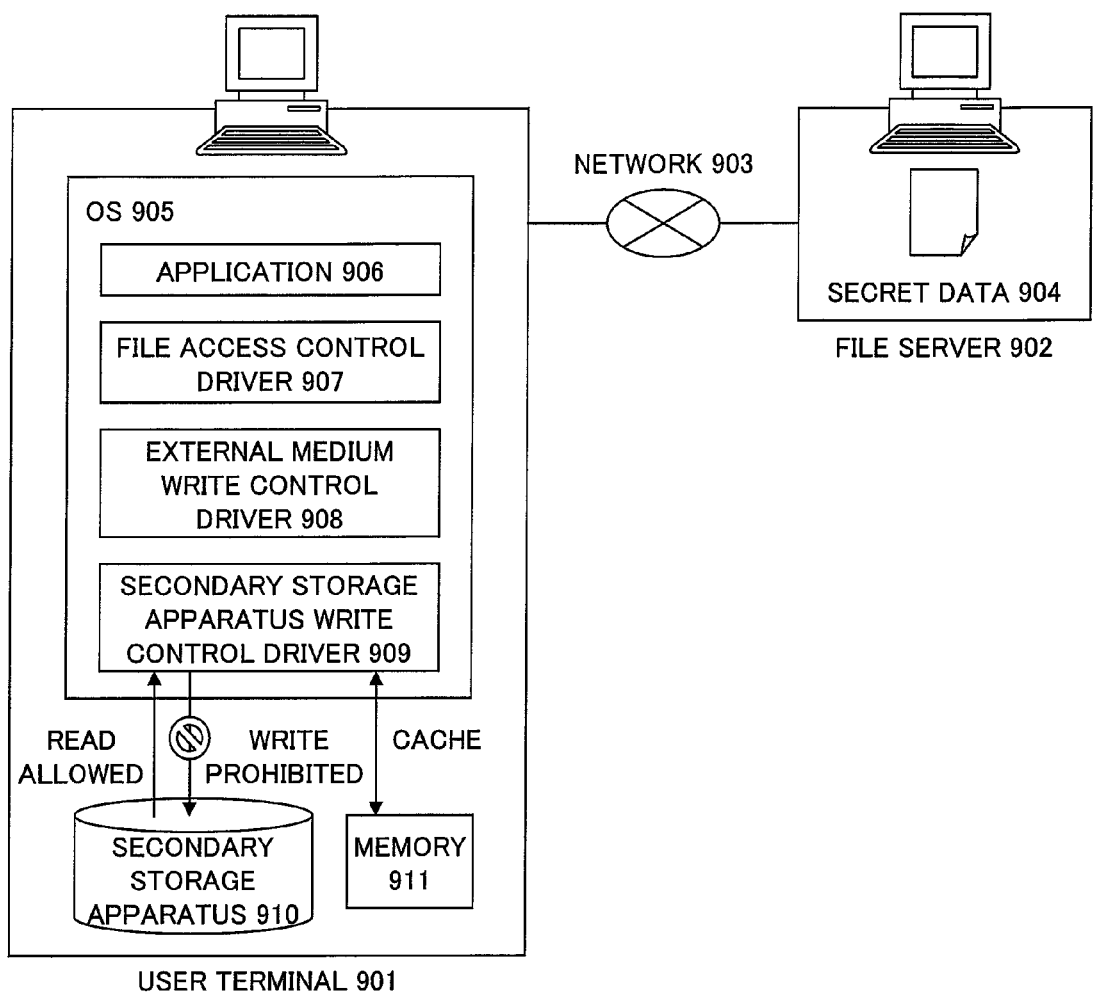
FIG. 9 is a diagram illustrating a configuration of a data processing control system according to the second exemplary embodiment of the present invention.

FIG. 9 is a system configuration diagram according to the second exemplary embodiment of the present invention. The system adopts such a configuration that a user terminal 901 is connected to a file server 902 through a network 903. The user terminal 901 includes a memory 911 and a secondary storage apparatus 910, and OS 905, an application 906, a file access control driver 907, an external medium write control driver 908, and a secondary storage apparatus write control driver 909 are installed. The file access control driver 907 is a filter driver located on the higher level than the file system, and hooks a file I/O to execute an I/O control for every file folder. Specifically, a write/read request to a specific folder is redirected to a specified folder on the file server. For example, in Windows XP (registered trade name), an access request to two folders, Document and Settings and Program Files is redirected to two specified folders copied to the file server 902 in a network destination. Thereby, an access to such two folders is actually an access to a folder on the file server 902. In an actual installation method, a redirect function can be realized by hooking IRP_MJ_CREATE request issued at a file open processing, designating a pass of a folder on the file server 902 in a network destination as a new pass, and returning STATUS_REPARSE error. The secondary storage apparatus write control driver 909 is a filter driver having a function which caches write data in the memory 911 when a write operation is required, retrieves the cache when a read operation is required, merges an overlapping part, and returns it to the file system. This filter driver, differing from the first exemplary embodiment, has just a function which caches in the memory 911, and prohibits a write operation to the secondary storage apparatus 910, but write data is lost when the electric power is turned off. Thus a file in a folder which has not been redirected to the file server 902 by the file access control driver 907 is prohibited to be written by this secondary storage apparatus write control driver 909.

Figure 10:
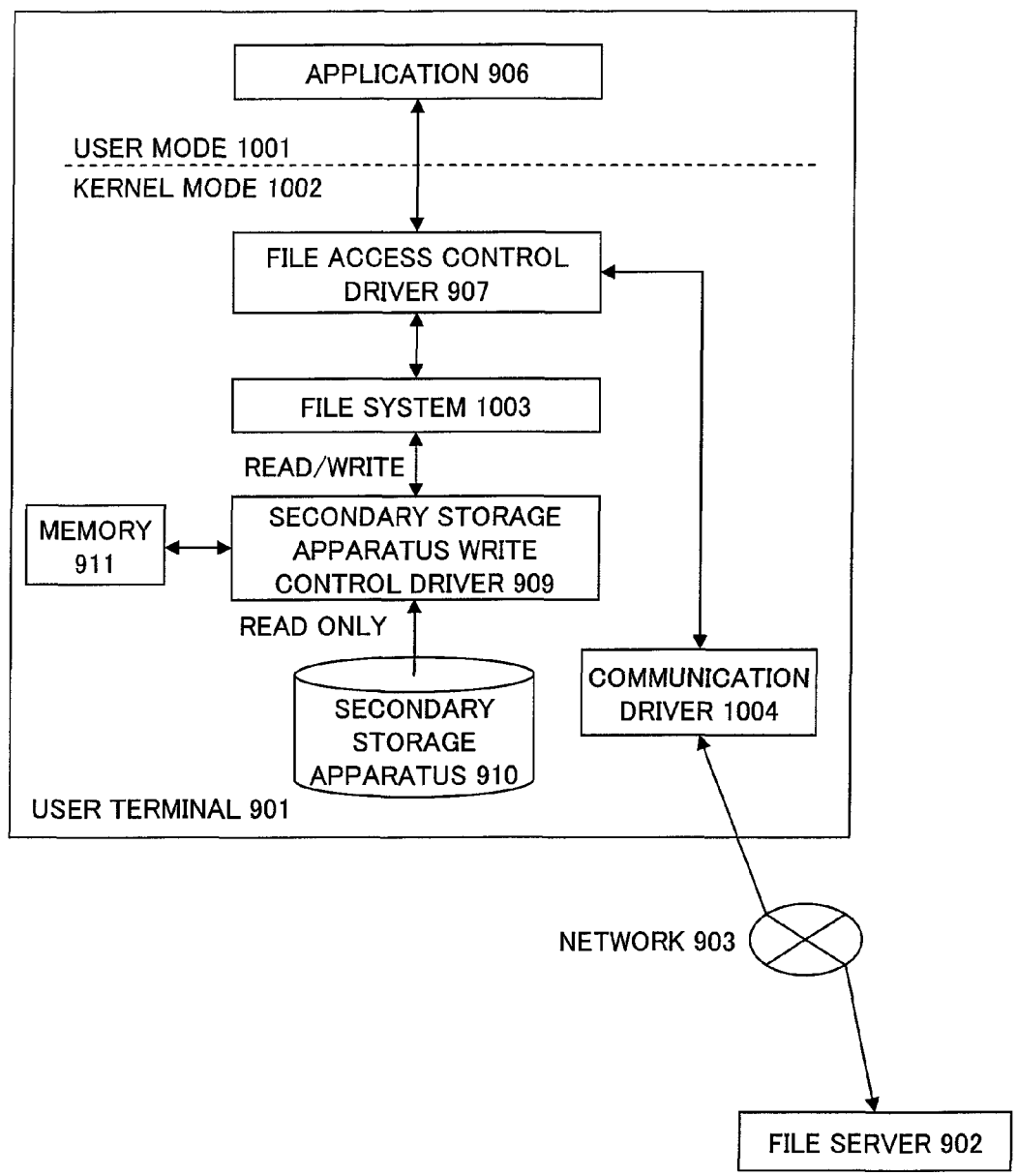
FIG. 10 is a diagram illustrating an internal architecture of a system according to the second exemplary embodiment of the present invention.

FIG. 10 is a diagram illustrating an internal architecture according to the second exemplary embodiment of the present invention. OS of the user terminal 901 is divided to two operation modes, a user mode 1001 and a kernel mode 1002, and, an application 906 in the user mode 1001 and a file access control driver 907, a file system 1003, a secondary storage apparatus write control driver 909, and a communication driver 1004 in the kernel mode 1002 are operating. The file access control driver 907 is a filter driver which is on the higher level than the file system, and watches a file I/O to execute a redirect processing.

The secondary storage apparatus write control driver 909 is located on the lower level than the file system, and caches write data in the memory 911 for a file access request from the higher level. Read data is retrieved in the cache (memory 911), if it is not in the cache, it is read from the secondary storage apparatus 910, and if it is in the cache, the part is read from the secondary storage apparatus 910, and a overlapping part between data existing in the cache (memory 911) and data existing in the secondary storage apparatus 910 is overwritten to the read data to be returned to the higher level file system.

In the system including the architecture of FIG. 10, if the user terminal 901 can not access the file server 902, it caches in the memory 911, and if it can access, data is cached in the file server 902 in order. Meanwhile, data which is not a file data (e.g. system information, etc.) and data which is not redirected to the file server 902 are only cached in the memory 911, so that they are lost every time the electric power of the user terminal 901 is turned off.

Figure 11:
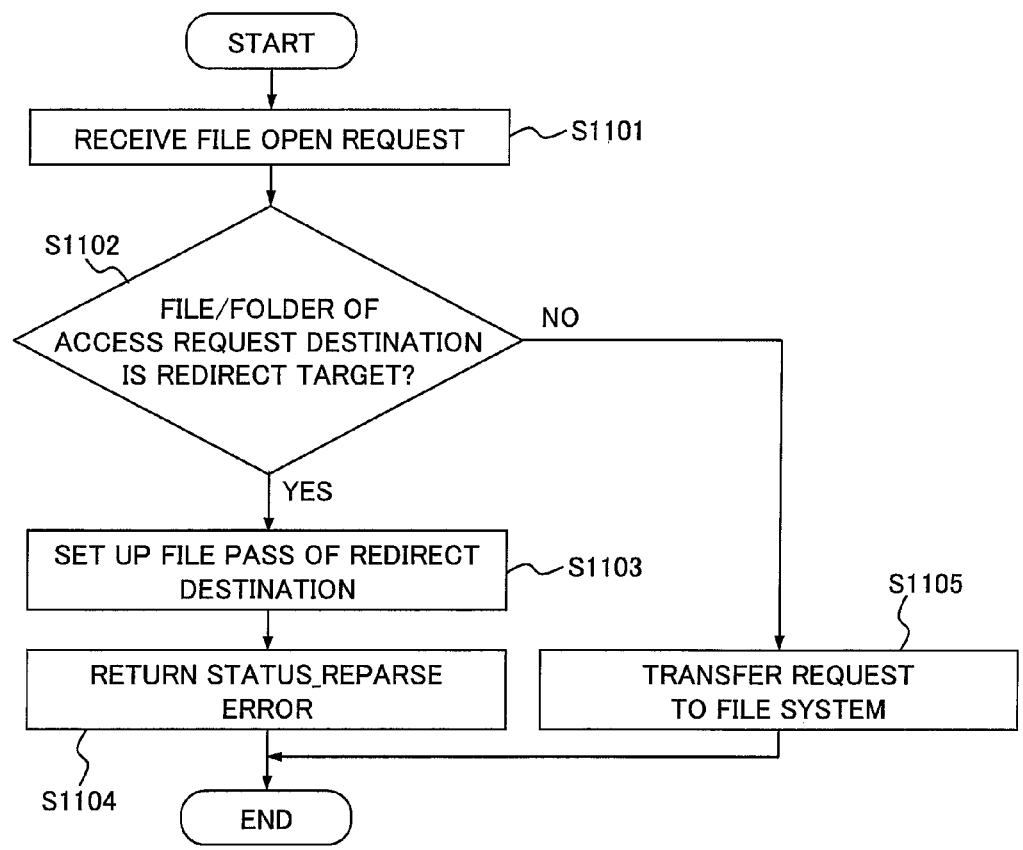
FIG. 11 is a flowchart describing processing of a file access control driver when a file is accessed.

FIG. 11 illustrates a flowchart of processing of the file access control driver when a file is accessed. First, if a file open request is received for a file stored in the secondary storage apparatus (step S1101), the file access control driver 907 checks a file or folder name of an access request destination, and decides whether or not the file/folder of the access request destination is a redirect target (step S1102).

If it is decided to be the redirect target at step S1102, a file pass of the redirect destination is set up (step S1103), and STATUS_REPARSE error is returned (step S1104). Thereby, an I/O manager executes a re-analysis, and re-issues an open request for a file pass of the redirect destination, so that a redirect of a file access is executed.

If it is decided not to be the redirect target at step S1102, a file open request is transferred directly to the file system (step S1105). Meanwhile, if it is required to store a file which is not the redirect target, the file may be copied to the above designated folder for a redirect.

Figure 12:
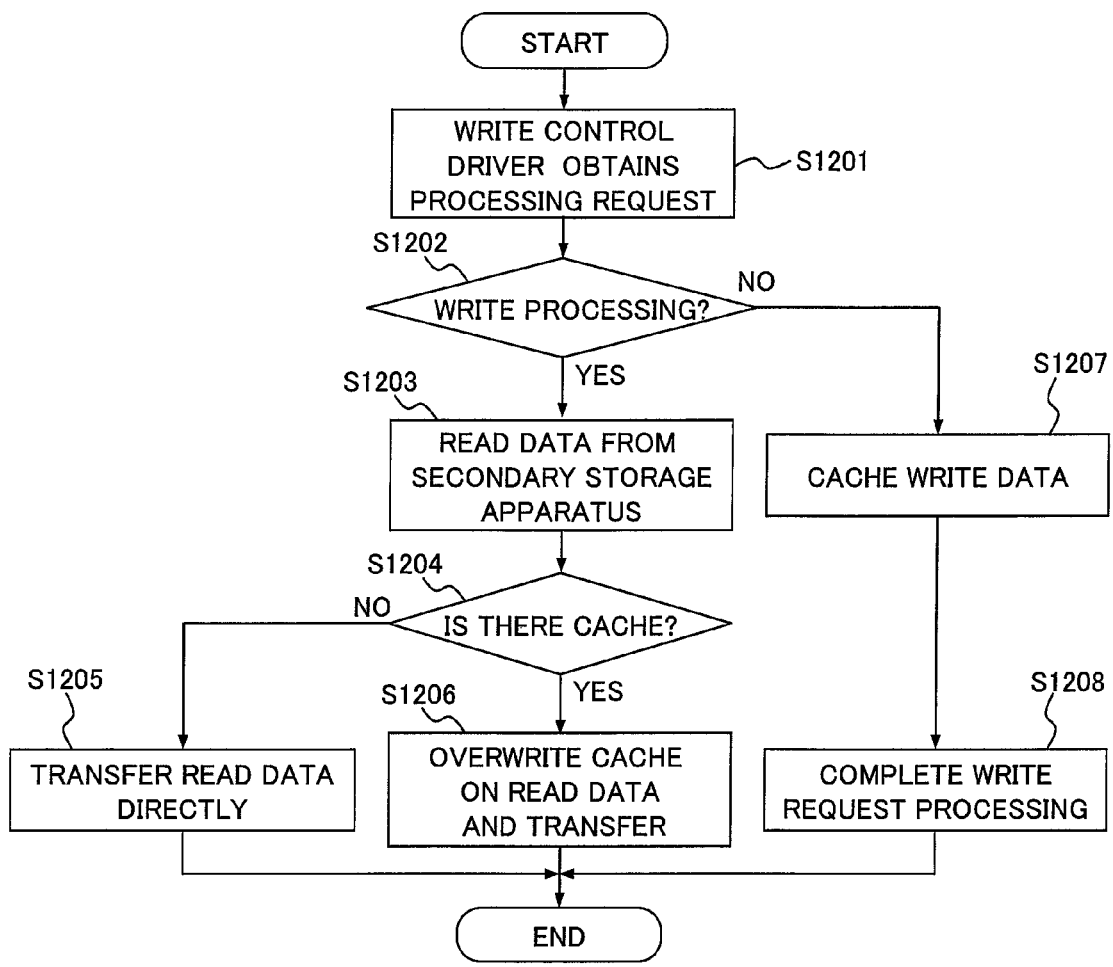
FIG. 12 is a flowchart describing processing of secondary storage apparatus write control driver when a file is accessed.

FIG. 12 is a flowchart of processing of the secondary storage apparatus write control driver 909 when a file is accessed. If a file access is not redirected to the file server 902 on a network, a write/read request is transferred to the secondary storage apparatus write control driver 909 through the file system 1003 (step S1201). When the request is received, it is decided whether or not the processing request is a write operation (step S1202). If it is a write operation, write data is cached in the memory 911 (step S1207), and a write request processing is completed (step S1208). If it is decided to be not a write, but a read operation at step S1202, data is read from the secondary storage apparatus 910 (step S1203).

Next, it is checked from a beginning block address and size information whether or not there is a cache (step S1204). If there is not a cache, read data is transferred directly to the file system 1003 (step S1205). If there is a cache in the memory 911, an overlapping part between cache data and read data is retrieved, the overlapping part is overwritten to the read data to be transferred to the file system (step S1206). According to this method, a write operation to the secondary storage apparatus 910 is prohibited, and the write data is cached only in the memory 911. Thus, such a system can be realized that the cache is lost when the electric power is turned off, and secret data does not remain in the local.

In the second exemplary embodiment as described above, it is redirected to the file server by the filter driver of the file system. However, in the case of the filter driver of the file system, because a timing that it is loaded when OS is initiated is late, if every one except a boot drive is redirected on the file server, and OS patch is applied, the redirect function may not operate when OS is initiated, and a patched file may be loaded only partially. Thus, in this exemplary embodiment, the OS patch must be executed in a writable mode and in such a mode that a local file is updated.

An application work of the OS patch by a user can be realized by providing a mode which is controlled by GUI, is applicable only for an update work of the OS patch, and is writable. For example, such an update mode can be realized by providing a GUI enabling from a menu button only a batch processing which stops the initiation of Windows (registered trade name) Shell, and executes the OS patch update.

SUMMARY

According to the exemplary embodiments described above, a secondary storage apparatus control unit installed in a user terminal obtains a processing request by any application to a secondary storage apparatus, prohibits a write operation to the secondary storage apparatus if this processing request is a data write request, and, instead, executes a write operation to a volatile memory (primary cache memory). Thereby, it is possible to prevent leakage/loss of secret data by prohibiting a write operation to the secondary storage apparatus (HDD), and the write operation to HDD is not simply prohibited, but it can seem by writing to the primary cache that the write operation to HDD is virtually executed, so that the processing is natural for a user.

The secondary storage apparatus control unit further stores the data written in the primary cache memory to an external storage unit (cache server: secondary cache) connected to the user terminal. While data stored only in the primary cache is lost if the electric power of the user terminal is turned off, it can be left in a server by the secondary cache. Because the data can be managed collectively in the server, convenience is improved.

Then, the secondary storage apparatus control unit writes a difference between data in an initial state of the secondary storage apparatus (data which is registered and exists in HDD from initially) and modified data (edited data, etc.) obtained by modifying the data to the primary cache memory (volatile memory). Because only the difference is stored in the memory, the capacity of the primary cache memory is not required to be large. After it is stored in the primary cache memory, it is finally stored in the cache server, and it is not required to access to the cache server every time, so that there is also such an advantage that processing speed is increased.

If the processing request is a data read request, data to be read is read from HDD, and the modified data (difference data obtained by editing) obtained by modifying this data to be read is read from the primary cache memory, and the data to be read is overwritten with this modified data and is presented. Thereby, even if the modified data is not stored in HDD, it can be presented in the modified state to the user. Because the user can accept such a sense that the modified data is read from HDD, it does not differ in appearance from the existing read operation, so that the user does not accept sense of incongruity.

When the user terminal is initiated, the secondary storage apparatus control unit controls the terminal to access the external storage unit (cache server) connected to the user terminal, obtains attribute information of data stored in the external storage unit, and generates a data list (primary cache management table) having the attribute information in the primary cache memory. The data list includes the attribute information of an address (storing location) of data in HDD, a size of data, and an address (storing location) in the primary cache memory. Further, the data list includes information indicating whether or not data itself stored in the cache server exists in the primary cache memory. Thereby, the relation between the original data in HDD and the modified data can be controlled certainly in the primary cache, so that the efficiency of data processing is increased.

According to the second exemplary embodiment described above, it is characterized in that a file access control unit installed in the user terminal obtains a processing request by any application to HDD to determine a content of the request, if a file or a folder targeted by this processing request should be transferred to the file server in a network destination, it is transferred to the file server, and if a file or a folder targeted by the processing request should not be transferred to the file server, the secondary storage apparatus control unit installed in the user terminal obtains the processing request, prohibits a write operation to HDD, and, instead, executes a write operation to the primary cache memory (volatile memory).

Thereby, leakage/loss of secret information can be prevented, an automatic file collection to the server is possible, and the convenience of this system can be increased without changing an application mode of the user terminal.

If the processing request is a data read request, data to be read (original file data) is read from HDD, the modified data which is obtained by modifying this data to be read is read from the primary cache memory, and the data to be read is overwritten with this modified data and is presented. Thereby, it can be presented in the modified state to the user even if the modified file data is not stored in HDD. Because the user can accept such a sense that the modified file data is read from HDD, it does not differ in appearance from the existing read operation, so that the user does not accept sense of incongruity.

Meanwhile, all of publications, patents, and patent applications which are quoted in this specification are applied as reference directly to this specification.

The present invention is not limited by the above disclosed exemplary embodiments, and without any departure from the scope limited by the claims, any reconfiguration, modification, and substitution are available.

The invention claimed is:

1. A method of controlling data processing for a secondary storage apparatus of an information processing apparatus provided with the secondary storage apparatus, wherein the secondary storage apparatus stores original data and modified data of the original data is prohibited to be stored in the secondary storage apparatus, the method comprising:

providing a secondary storage apparatus control unit, installed in the information processing apparatus in a layer lower than a file system in an internal architecture of the information processing apparatus, and obtaining via the file system a processing request by any application run on the information processing apparatus to the secondary storage apparatus; and the secondary storage apparatus control unit, if the processing request is a data write request, prohibiting a write operation to the secondary storage apparatus, and, instead, executing a write operation to a volatile memory, wherein, when the information processing apparatus is initiated, the secondary storage apparatus control unit controls the information processing apparatus to access a server connected to the information processing apparatus via a network, obtains attribute information of data stored in the server, and generates a data list having the attribute information in the volatile memory.

2. The data processing control method according to claim 1, wherein the secondary storage apparatus control unit further stores data written in the volatile memory in an external storage unit connected to the information processing apparatus.

3. The data processing control method according to claim 1, wherein the secondary storage apparatus control unit writes, to the volatile memory, a difference between data in an initial state of the secondary storage apparatus and modified data obtained by modifying the data.

4. The data processing control method according to claim 1, wherein if the processing request is a data read request, data to be read is read from the secondary storage apparatus, modified data which is obtained by modifying this data to be read is read from the volatile memory, and the data that is read from the secondary storage apparatus is overwritten with the modified data and is provided for the data read request.

5. The data processing control method according to claim 1, wherein the data list includes the attribute information of an address of the data in the secondary storage apparatus, a size of the data, and an address in the volatile memory.

6. The data processing control method according to claim 5, wherein the data list further includes information indicating whether or not data stored in the external storage unit exists in the volatile memory.

7. A method of controlling data processing for a secondary storage apparatus of a first information processing apparatus provided with the secondary storage apparatus, wherein the secondary storage apparatus stores original data and modified data of the original data is prohibited to be stored in the secondary storage apparatus, the method comprising:

providing a file access control unit that obtains via the file system a processing request by any application run on the first information processing apparatus to the secondary storage apparatus to determine a content of the request, and if a file or a folder targeted by the processing request should be transferred to a second information processing apparatus in a network destination, the file or the folder is transferred to the second information processing apparatus, and providing a secondary storage apparatus control unit installed in the first information processing apparatus in a layer lower than a file system in the internal architecture of the first information processing apparatus, and if the file or the folder targeted by the processing request should not be transferred to the second information processing apparatus, the secondary storage apparatus control unit obtains the processing request, prohibits a write operation to the secondary storage apparatus, and, instead, executes a write operation of the targeted file or the folder to a volatile memory, wherein, when the information processing apparatus is initiated, the secondary storage apparatus control unit controls the first information processing apparatus to access a server connected to the information processing apparatus via a network, obtains attribute information of data stored in the server, and generates a data list having the attribute information in the volatile memory.

8. The data processing control method according to claim 7, wherein if the processing request is a data read request, data to be read is read from the secondary storage apparatus, modified data which is obtained by modifying the data read form the secondary storage apparatus is read from the volatile memory, and the data read from the secondary storage apparatus is overwritten with the modified data and provided for the data read request.

9. An information processing apparatus, comprising:
a secondary storage apparatus, wherein the secondary storage apparatus stores original data;
a file system which includes a file driver;
a secondary storage apparatus control unit for controlling processing for the secondary storage apparatus; and
a volatile memory,
wherein the secondary storage apparatus control unit is installed in the information processing apparatus in a layer lower than a file system in an internal architecture of the information processing apparatus and obtains a processing request by any application run on the information processing apparatus to the secondary storage apparatus, and if the obtained processing request is a data write request, prohibits a write operation to the secondary storage apparatus, and, instead, executes a write operation to a volatile memory, and wherein, when the information processing apparatus is initiated, the secondary storage apparatus control unit controls the information processing apparatus to access a server connected to the information processing apparatus via a network, obtains attribute information of data stored in the server, and generates a data list having the attribute information in the volatile memory.

10. The information processing apparatus according to claim 9, wherein the secondary storage apparatus control unit further stores data written in the volatile memory in an external storage unit connected to the information processing apparatus.

11. An information processing apparatus, comprising:
a secondary storage apparatus;
a file system which includes a file driver;
a file access control unit for controlling a file access to an external storage unit connected through a network;
a secondary storage apparatus control unit for controlling processing for the secondary storage apparatus; and
a volatile memory,
wherein the secondary storage apparatus control unit is installed in the information processing apparatus in a layer lower than a file system in an internal architecture of the information processing apparatus,
wherein the file access control unit obtains via the file system a processing request by any application run on the information processing to the secondary storage apparatus to determine a content of the request, and if a file or a folder targeted by this processing request should be transferred to the external storage unit in a network destination, transfers the targeted file or the folder to the external storage unit, and
if the file or the folder targeted by the processing request should not be transferred to the external storage unit, the secondary storage apparatus control unit obtains the processing request, prohibits a write operation to the secondary storage apparatus, and, instead, executes the write operation of the targeted file or the folder to the volatile memory,
wherein, when the information processing apparatus is initiated, the secondary storage apparatus control unit controls the information processing apparatus to access a server connected to the information processing apparatus via a network, obtains attribute information of data stored in the server, and generates a data list having the attribute information in the volatile memory.

* * * * *